May 11, 1937.  W. H. MANNING  2,079,945
LAWN MOWER
Filed April 27, 1933  4 Sheets-Sheet 1

INVENTOR.
William H. Manning
BY
Harness, Dickey, Pierce & Hann.
ATTORNEYS.

May 11, 1937.  W. H. MANNING  2,079,945
LAWN MOWER
Filed April 27, 1933  4 Sheets-Sheet 2

INVENTOR.
William H. Manning
BY
Harness, Dickey, Pierce & Hann
ATTORNEYS.

May 11, 1937.　　W. H. MANNING　　2,079,945
LAWN MOWER
Filed April 27, 1933　　4 Sheets-Sheet 3

INVENTOR.
William H. Manning
BY
ATTORNEYS.

May 11, 1937.  W. H. MANNING  2,079,945
LAWN MOWER
Filed April 27, 1933   4 Sheets-Sheet 4

INVENTOR.
William H. Manning
BY
Harness, Dickey, Pierce & Hann
ATTORNEYS.

Patented May 11, 1937

2,079,945

UNITED STATES PATENT OFFICE 2,079,945

LAWN MOWER

William H. Manning, Pontiac, Mich.

Application April 27, 1933, Serial No. 668,150

27 Claims. (Cl. 56—244)

The invention relates generally to mowing machines and it has particular relation to a lawn mower.

One object of the invention is to provide an improved mower which will cut grass evenly with respect to the ground surface and thereby eliminate the usual wave or ripple effect characteristically obtained in the lawn mower having revolving blades.

Another object of the invention is to provide a mower of the above character which will cut grass evenly regardless of the usual variations in the height of grass before it is cut.

Another object of the invention is to provide a mower having the above operating characteristics, in which forces required in cutting the grass are evenly and smoothly distributed to the end that the mower may be operated by a substantially constant and small propelling force.

Another object of the invention is to provide a mower having ground contacting drive wheels, which is so constructed and arranged that the wheels will roll on or contact with only the ground from which the grass has been cut, so that the flattening and consequent leaving of strips of uncut grass by wheels of the mower running thereover prior to cutting, is avoided.

Another object of the invention is to provide an improved mower which will distribute the cut grass evenly behind the mower as it operates. This is advantageous in that if the cut grass is evenly distributed and not deposited in bunches, it need not ordinarily be collected and does not detract from the appearance of the lawn.

Another object of the invention is to provide a mower which operates silently thereby avoiding the irritating noises such as occur during operation of the ordinary lawn mower.

Another object of the invention is to provide a mower in which the drive wheels may impart driving forces to the cutting mechanism in an improved and differential manner.

Another object of the invention is to provide a mower having characteristics such as mentioned, which is operated by power driven means.

Another object of the invention is to provide a power driven mower having ground contacting drive wheels, wherein improved means are provided for driving both wheels or varying the driving force imparted to either wheel, so as to enable making turns with the mower.

Another object of the invention is to provide a lawn mower which is so constructed that a minimum number of parts is required, and so arranged that these parts may be readily assembled and disassembled to facilitate manufacture and replacements, to the end that an efficient and inexpensive construction may be produced.

Other objects of the invention will become apparent from the following description relating to the accompanying drawings and from the claims hereinafter set forth.

For a better understanding of the invention reference may be had to the drawings wherein:

Fig. 8 is a cross-sectional view taken substantially along the line 8—8 of Fig. 7.

Figure 1:
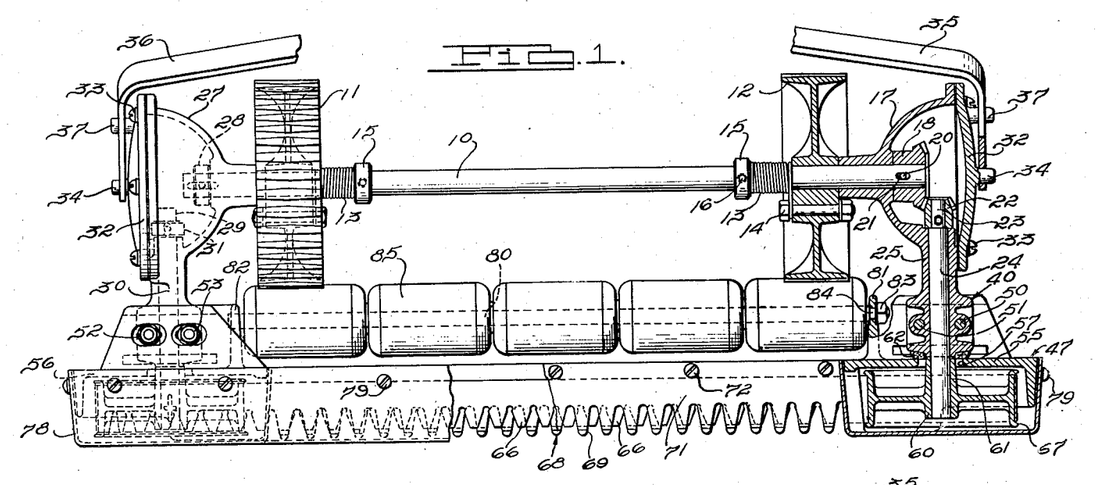
Figure 1 is a plan view of a lawn mower constructed according to one form of the invention, with certain parts broken away and others shown in cross section for the purpose of more clearly illustrating details of the construction.
Figure 2:
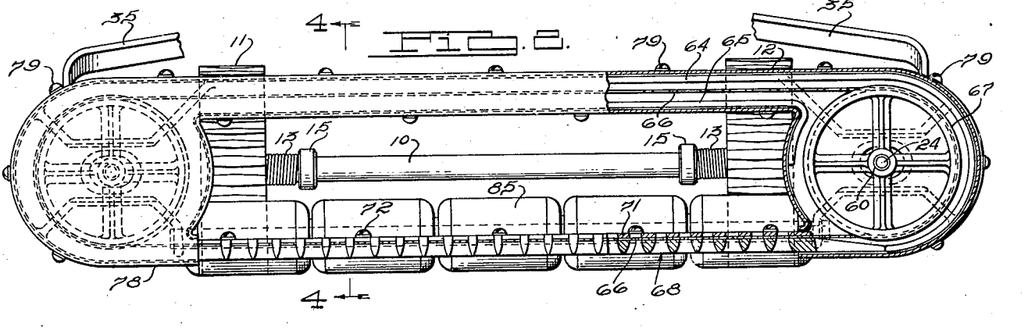
Fig. 2 is a front elevational view of the lawn mower shown by Fig. 1, also having parts broken away and others shown in cross section to illustrate certain details more clearly.

Referring to Fig. 1, a drive shaft 10 is provided having spaced drive wheels 11 and 12 rotatably mounted thereon. Each of the drive wheels is operatively connected to the shaft by a helical spring 13 wound around the shaft and which has one end connected to the wheel by a bolt 14. The other end of the spring abuts a collar 15 on the shaft which may adjustably be secured thereto by a set screw 16. The springs fit the shaft rather closely, and are so wound respectively, that upon turning of the wheels forwardly, the latter tend to wind the springs and cause them to grip the shaft even more forcefully, thus transmitting the driving force through the frictional engagement of the springs with the shaft. If either wheel is rotated rearwardly, it tends to unwind the spring sufficiently to relieve the frictional contact between the spring and shaft and allow the spring bodily to move around the shaft as the wheel rotates. Thus the mower may be moved in a rearward direction without the wheels rotating the shaft. In conjunction with each other, the springs provide a differential drive, allowing one wheel to rotate forwardly more than the other, for as one wheel begins to rotate forwardly more than the other, it drives the shaft and relatively speaking the other wheel is rotating rearwardly with respect to the shaft, and this causes the spring for the latter wheel to unwind sufficiently to allow it to turn relative to the shaft. This is advantageous particularly in making turns with the mower when one wheel must move over more ground than the other.

At the outer side of wheel 12, the shaft projects into a hollow casting 17 and within the casting has a bevel gear 18 mounted thereon. This gear is adjustable longitudinally of the shaft and for maintaining the gear in any adjusted position, a set screw 20 may be threaded through the gear and have its inner end engaging an elongated flat surface 21 formed on the shaft. The gear 18 meshes with a smaller bevel gear 22 which similarly may be adjustably secured to a smaller portion 23 of a shaft 24 projecting forwardly at right angles to shaft 10 and which is journaled in a forwardly extending portion 25 of the casting. Accordingly, when the shaft 10 is driven, shaft 24 will be driven. It might be noted in this connection that the size of bevel gears 18 and 22 may be varied so as to change the ratio of the speeds of the shafts.

The end of shaft 10 at the outer side of wheel 11 projects into a hollow casting 27 which is identical to casting 17. This end of the shaft in casting 27, however, instead of being provided with a bevel gear, has a collar 28 adjustably secured thereon and it will be appreciated that the shaft may be maintained in a definite although adjustable relation to the castings and the wheels by the beveled gear and collar on the ends of the shaft which abut inner portions of the castings.

The casting 27 similarly has a forwardly projecting shaft 29 journaled in a forwardly projecting portion 30 of the casting, and this shaft may be substantially identical to shaft 24 with the exception that, instead of providing a bevel gear on its end within the casting, a collar 31 is adjustably secured to the end of the shaft. Each of the castings 17 and 27 is open at its outer side but is normally closed by a cover plate 32 secured by cap screws 33 to the rim of the casting. It may be noted in this connection that the rim of the casting is circular and hence that the cover plates 32 are of circular form. The cap screws 33 are equally spaced in a circumferential direction and, accordingly, before applying the cover, it may be turned to variable positions with respect to the rim of the casting. Each cover has a centrally located projection 34 and on these projections a handle having arms 35 and 36 may be pivotally mounted by providing openings in the ends of the arms which receive the projections. It will be understood that the handle may be of conventional construction such as used in ordinary lawn mowers. At another point and adjacent its outer periphery, each of the cover plates 32 may have a second projection 37 adapted to act as a limit or stop to pivotal movement of the handle arms in a downward direction. Thus falling of the handle entirely to the ground may be avoided when it is released by the operator. It will be appreciated that by removing the handle and covers and turning the latter as desired, the projections 37 may be disposed at other points and that the limiting stops or limits to which the handle may be moved downwardly may be varied. Use of a larger number of screws 33 would of course, enable a smaller adjustment of the cover plate and stop 37. Normally, the stop 37 will be so located that if the handle is released, it falls only a limited distance. In the event a sloping terrace is to be mowed, the arms 35 and 36 may be sprung from projections 34, and then mounted on projections 37. This will allow free rolling movement of the mower down an inclined surface without causing tilting of the handle to a point where holding of the latter would be difficult.

Figure 3:
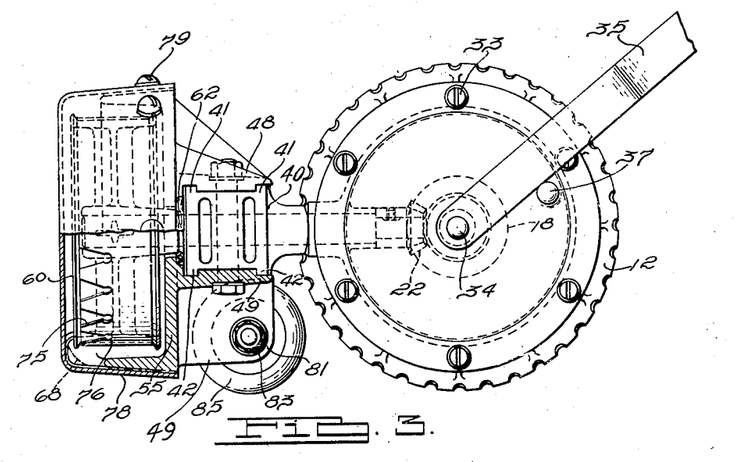
Fig. 3 is an end elevational view of the mower in which also certain parts are broken away and others are shown in cross section.
Figure 4:
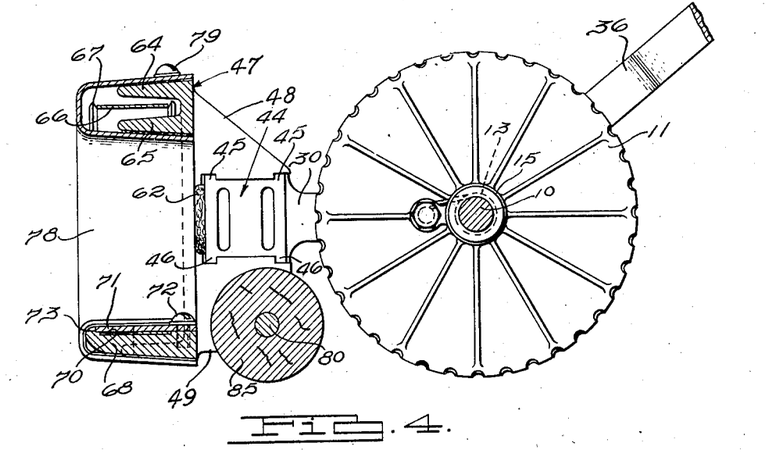
Fig. 4 is a cross-sectional view on a larger scale taken substantially along the line 4—4 of Fig. 2.

The forwardly projecting portion 25 of casting 17 terminates in a slide 40 which, as best shown by Figs. 3 and 4, has spaced upper ribs 41 and spaced lower ribs 42. The forwardly projecting portion 30 of casting 27, as shown by Fig. 4, similarly terminates in a slide 44 having spaced upper ribs 45 and spaced lower ribs 46. The two slides are adjustably mounted in a single casting 47 extending entirely across the front of the mower, and for effecting this adjustable mounting of the slides, it will be noted as shown by Figs. 3 and 4 that the back side of the casting at opposite sides of the mower has vertically spaced arms 48 and 49 having guideways for receiving the ribs on the slides.

The casting 47 is in the form of an elongated annulus extending transversely of the mower at the front side thereof, and has generally circular back plate portions 55 and 56 at each side of the mower. These back plate portions are in front of the arms 48 and 49 supporting the slides, and are integral therewith. Each of the back plate portions 55 and 56 has an elongated opening 57 through which the shafts 24 and 29 project to points forwardly thereof, and each shaft in front of the back plate portions has a pulley wheel 60 press fitted thereon for rotation with the shaft. The pulleys have hub portions 61 that project through the openings 57 and abut the forward faces of the slides and packing rings 62, disposed between the slides and the back wall portions, extend around and over the openings 57 to prevent ingress of dirt or other foreign matter through the openings from the back side of the casting. These packing rings are sufficiently large that the slides may be adjusted with respect to the casting and the openings 57 therein, without uncovering the latter.

The casting is open largely between the back plate portions 55 and 56 and between upper parts of the latter a forwardly projecting rib 64 extends transversely and then around the edge of the plate portions to points adjacent the bottom side of the pulley wheels. A second rib 65 integral with the rear part of rib 64 and slightly spaced vertically with respect thereto extends between the wall portions 55 and 56 and at opposite ends curves downwardly and slightly around adjacent peripheral edges of the wall portions. The ribs 64 and 65 across the top of the casting constitute a guideway at the top for an endless cutter band 66 trained around the pulley wheels and it will be noted that each pulley wheel has flanges as indicated at 67 for constituting a guide for the band during its movement around the wheels.

Across the lower part of the casting and between the back wall portions 55 and 56, an integral cutter bar 68 is provided which in effect constitutes an extension of the rib 64 although it is wider and thicker in dimensions. The cutter bar 68, as best shown by Fig. 1, has laterally spaced V-shaped notches 69 therein with the apex portions of the notches rearward and it will be appreciated that such notches are adapted to receive portions of the grass to be cut. This cutter bar and hence each of the teeth thus formed therein, as best shown by Fig. 4, has a shallow guideway 70 in the upper face thereof for receiving the lower run of the endless cutter band 66. Over the guideway, a retaining plate 71 is secured by screws 72 to the rear and upper side of the cutter bar, and the front edge of the plate fits into notches 73 formed in the front portion of the bar and the teeth therein. It will be observed that the upper face of the plate is flush with the upper face of the front portions of the teeth in the cutter bar. The retaining plate 71 extends to a point adjacent the lower sides of the pulley wheels and the endless band 66 enters the guideway 70 adjacent the ends of the plates. Similarly to the bar 68, the plate 71 is formed with V-shaped notches coinciding vertically with the notches in the bar.

As best shown by Fig. 3, the cutter band 66 is provided with V-shaped notches 75 forming teeth between the notches, and the apex of each notch is rounded as indicated at 76. This band preferably is composed of thin, clock spring steel which is well adapted for use as an endless cutter band because of its hardness and adaptability to bending without breaking. Owing to the difficulty encountered in cutting out portions of this steel in the band to form notches without breaking it, it is preferred to first form the rounded openings 76 and then stamp out the remaining portions of the notches. The rounded portions avoid any sharp apexes and splitting during formation of the V portions of the notches and furthermore avoid any sharp apices that might initiate splitting during operation of the band. By providing the rounded apex portion of the notches, the band is more resistant to fatigue stress and has greater durability.

In a length substantially equal to the notched portion of the stationary cutter bar 68, the endless cutter band is provided with one more notch or tooth than the number of teeth or notches in the bar. By having this variation, the teeth in the endless cutter band will progressively cut throughout the length of the stationary cutter bar and the cutting forces will be evenly and smoothly distributed. This is of considerable importance because during each increment of movement of the endless cutter band, approximately the same amount of grass is being cut as during any other increment of movement. Thus, only a small and constant force is required to drive the cutter band as compared to the force which would be required if the teeth in the band were of the same number as the teeth in the stationary bar, in which event all teeth would cut at the same time and larger and periodic driving forces would be required.

The front side of the casting is closed by a cover 78 secured to the casting by screws 79, which covers the pulley wheels, the upper transverse portion of the casting including the ribs 64 and 65, and extends substantially to opposite ends of the blade retaining plate 73. Thus the front part of the casting and the mechanism housed thereby, except for the stationary cutter bar, is closed and this prevents undesirable ingress of dirt or other foreign matter into working parts of the mechanism.

Behind the stationary cutter bar, a shaft 80 is journaled in arms 81 and 82 integral with the back plate portions 55 and 56, and a plurality of rollers 85 are rotatably mounted on the shaft for supporting the front end of the mower. The right end of the shaft 80 has a reduced portion 84 extending through the arm 81 and a nut 83 threaded on the outer end of such reduced portion firmly holds the shaft in position against lateral movement while permitting removal readily, merely by removing the nut and withdrawing the shaft from the left side of arm 82. Use of a plurality of rollers facilitates turning of the mower, and decreases the cost of manufacture and cost of any replacements of roller parts.

Figure 5:
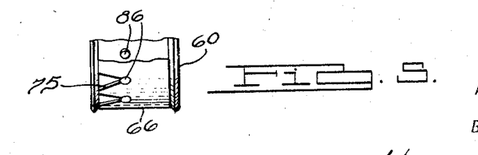
Fig. 5 is a detail view illustrating a different type of pulley that may be used in driving the endless cutting band.

If desired, and as shown by Fig. 5, one or both pulley wheels and particularly the driving pulley wheel, may have circumferentially spaced pins 86 on the outer surface thereof for cooperation with the openings 76 in the endless cutter band. These pins would serve to more positively drive the endless cutter band although usually pins of this character need not be provided as sufficient tension may be placed on the band to insure its being driven by the driven pulley wheel. Under certain circumstances it may be in fact advisable to not use pins of this character to permit some slippage of the endless cutter band particularly in the event objects become lodged between the teeth of the stationary cutter bar and impede progress of the endless band. It will be appreciated that the tension on the endless cutter band may be varied and adjusted by moving one or both of the slides 40 and 44. In adjusting the slides it will of course be necessary to adjust the castings 17 and 27 with respect to shaft 10 but the manner in which this may be effected has already been described.

It will be appreciated that there will be no tendency for the front end of the mower to jump up and down because the cutting operation is effected in a transverse path and hence an even cutting of the grass may be effected. During cutting of the grass, the cut grass will move rearwardly over the plate 71 and normally under the rollers 85 and will be laid on the ground behind the mower in an even fashion. This will avoid the depositing of large bunches of grass at intervals which might ultimately cause damage to the grass still rooted in the ground, unless it were collected during the mowing operation or subsequent thereto.

Owing to the nature of the bevel gear drive, the front end of the mower naturally is held downwardly so as to maintain the rollers 85 in contact with the ground. This further insures cutting of the grass at an even height and hence leaving a nicely cut appearance to the lawn. In view of the fact that the front edge of the lawn mower is straight and substantially in alignment with the teeth, the mower may be moved in a path transversely to walls, fences and the like and the grass may be cut very closely thereto.

In arranging the driving mechanism, bevel gears or/and drive wheels of such size and relation are used that the grass is cut more rapidly than the mower is moved forwardly. In other words, if the mower is moved forwardly, the drive wheels will move the endless cutter band at such a rate of speed, that the grass entering the notches in the bar 68 will be cut before it can reach the back part of the notches. This will avoid leaving any uncut grass.

It will be observed that the drive wheels 11 and 12 are located behind the stationary cutter bar so that during operation of the mower the wheels will operate only over grass that has already been cut, thus avoiding the flattening and leaving of uncut grass as occurs during operation of the ordinary lawn mower.

A mower of the type described will operate smoothly and with substantially no noise and this will be appreciated by any user of lawn mowers who is accustomed to the irritating noise of the ordinary lawn mower.

Figures 5, 6, 7, 9:
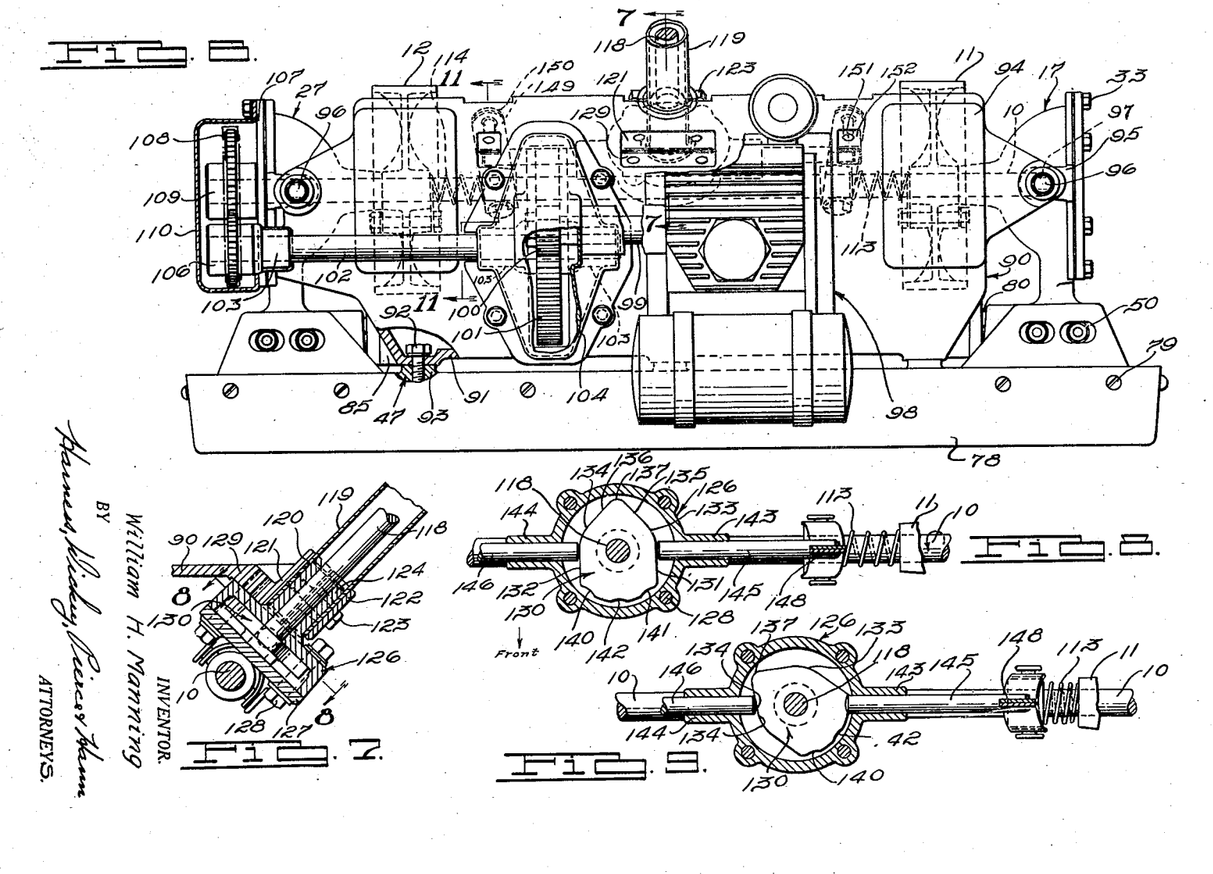
Fig. 6 is a plan view of a power driven mower constructed according to one form of the invention.
Fig. 7 is a cross-sectional view taken substantially along the line 7—7 of Fig. 6 and illustrating parts of the steering mechanism.
Fig. 9 is a view similar to Fig. 8, but illustrating the parts in a different relation.
Figure 10:
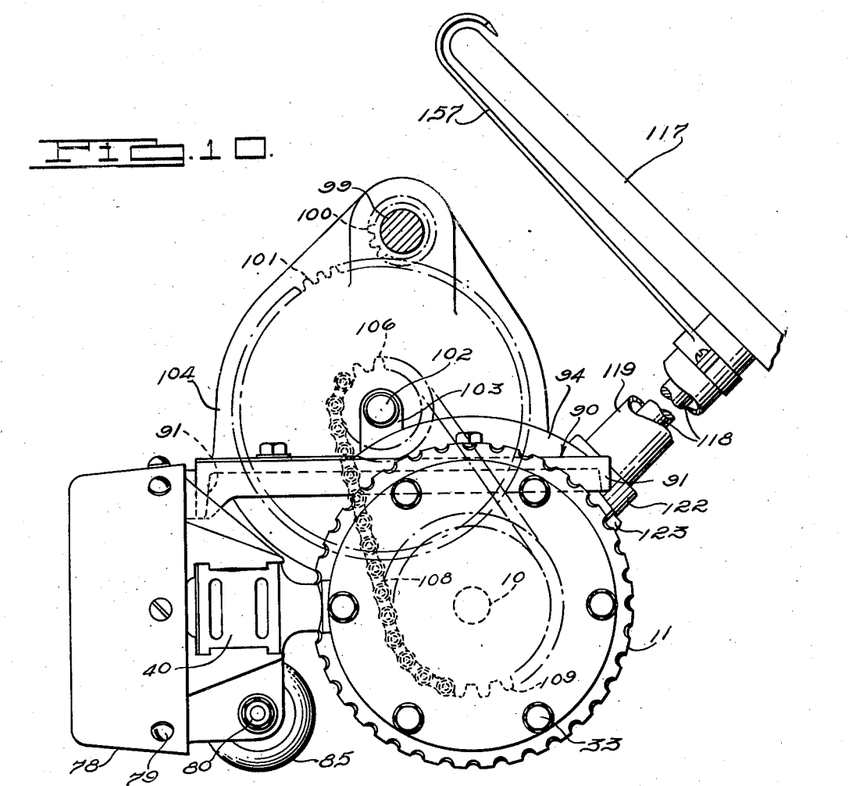
Fig. 10 is an enlarged end elevational view of the mower shown by Fig. 6, as seen from the right end of the figure.
Figure 11:
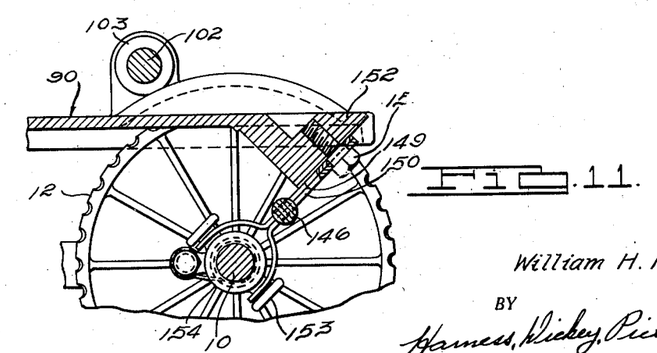
Fig. 11 is a cross-sectional view taken substantially along the line 11—11 of Fig. 6.

Figs. 6 to 11 inclusive, relate to a power driven lawn mower and the general distinction between this mower and that already described in detail, is that the shaft upon which the wheels 11 and 12 are mounted is driven by power operated means such as an internal combustion engine, which is drivingly connected to the shaft and through the latter imparts driving movement to the wheels. Referring to Figs. 6 and 10 particularly, a plate casting 90 is provided and this casting has an integral and downwardly extending flange 91 formed around its margin which at its front edge is secured to casting 47 by bolts 92 threaded into bosses 93 on the latter. The plate casting 90 extends rearwardly over and above the wheels 11 and 12 and for accommodating upper portions of the wheels the casting is formed with recessed portions 94 so as to permit rotation of the wheels without engagement thereof with any parts of the casting. As its lateral ends, the casting 90 extends over the housings 17 and 27 at opposite ends of shaft 10, and is secured to boss portions 95 of the housings by bolts 96 which project through elongated openings 97 in the plate casting. The elongated openings 97 allow adjustment of the housings 17 and 27 with respect to casting 90 and hence with respect to the casting 47 in the manner previously pointed out.

An internal combustion engine of conventional construction and as indicated at 98, may be rigidly supported on the upper side of the casting 90 in any suitable manner. The crank shaft of this engine is indicated at 99 and at its outer end has a small pinion 100 rigidly mounted thereon. The pinion meshes with a large pinion 101 mounted on a shaft 102 that is journaled in upwardly projecting bosses 103 on the plate casting 90. The pinions 100 and 101 provide a desired reduction gearing, and for enclosing the pinions, a sheet metal cover or housing 104 is provided which may be bolted to the plate casting. The outer end of shaft 102 extends beyond the plane of the housing 27, and has a sprocket wheel 106 rigidly mounted thereon for rotation with the shaft. In this connection it may be noted that the housings 17 and 27 have plane covers 107 instead of the rounded covers previously described. A sprocket chain 108 trained around the sprocket wheel 106, also is trained around a large sprocket wheel 109 mounted on the end of shaft 10 which in this construction, projects through the cover plate 107 on housing 27. The sprocket wheel and chain assembly preferably is covered by a sheet metal housing 110 which may be bolted to the housing 27 by means of the same bolts which secure the plate 107 thereto. The sprocket wheels and the reduction gearing previously mentioned, are so designed that the shaft 10 may be driven at such speeds that the wheels 11 and 12 thereon will move the lawn mower over the ground at what may be termed a walking speed, although manifestly this speed may be varied by varying the speed of the engine.

For imparting rotary movement of the shaft 10 to the wheels 11 and 12, helical springs 113 and 114 are provided on the shaft and adjacent the wheels respectively, and one end of each spring is bolted to its wheel in the same manner as already described. Normally, the convolutions of the springs are spaced and the springs are so wound that during forward rotation of the shaft, the tendency of the wheels to lag behind with respect to rotation, causes the springs to be wound more tightly about the shaft and hence to more strongly engage the latter in a frictional manner. This binding of the springs on the shaft drivingly connects the latter to the wheels and consequently causes forward movement of the lawn mower.

It will be evident that if either spring is compressed axially with respect to the condition of the spring as shown by Fig. 8, the diameter of the spring will increase and this will relieve the binding action of the spring on the shaft and if the spring is compressed sufficiently, the shaft may rotate in the spring and hence without turning the wheel to which the latter is connected. Accordingly, during forward rotation of the shaft and hence forward movement of the lawn mower, if one spring is compressed axially, the driving connection between the shaft and the adjacent wheel, will be interrupted and this side of the lawn mower will tend to drop behind while the opposite side is moved forwardly by the wheel at the latter side of the mower. This will result in a turning of the lawn mower. The degree of turning may be varied by varying the compression of the spring and if the spring is not compressed too much, some slippage of the shaft with respect to the spring may occur so as not to entirely interrupt the driving connection and permit a partially interrupted driving connection. It will be readily appreciated that compression of either spring may be effected to turn the lawn mower in either direction and turn it quickly or more slowly.

For the purpose of steering the lawn mower by using this principle of operation, a steering wheel 117 is provided as shown by Fig. 10. and this wheel is rigidly connected with an obliquely arranged shaft 118 journaled at its upper end in a bearing (not shown) in a stationary sleeve 119, so that by rotating the steering wheel, the shaft 118 also rotates. As shown best by Fig. 7, the sleeve 119 is seated in an opening 120 formed in a boss portion 121 integral with the plate casting 90 and which is located substantially intermediate the side edges of the casting. The sleeve is rigidly held in the opening 120 by an arcuate clamping plate 122 fitting one-half of the sleeve and having opposite side portions bolted as indicated at 123, to the boss portion of the casting. A bearing 124 disposed between the shaft 118 and the inner surface of the sleeve rotatably supports the lower end of the shaft, and this bearing is integral with a hollow casting 126 into which the shaft projects and which is normally closed by a cover plate 127 secured thereto by bolts 128. It will be noted that two of these bolts also are threaded into an inclined portion 129 of the plate casting. This provides a rigid mounting which may be assembled and disassembled without difficulty. Within the housing 126 and as best shown by Fig. 8, shaft 118 has a cam plate 130 secured thereto and this cam plate has substantially parallel side cam surfaces 131 and 132 which at one end merge into curved cam surfaces 133 and 134 that are substantially concentric to the axis of the shaft. Such curved surfaces terminate in plane surfaces 135 and 136 disposed in V relation and which terminate in an apex 137. Diametrically opposite the apex the plate is generally arcuate and concentric to the axis of the shaft with a radius substantially equal to the radial distance of the apex and this arcuate surface is recessed at opposite sides of its center as indicated at 140 and 141 and has a central recess 142.

The casting 126 at diametrically opposite sides has bearing portions 143 and 144 and a pair of rods 145 and 146 are journaled in openings therein and project into engagement with the edge faces of the cam plate 130. Referring now to both Figs. 8 and 11, each of the rods 145 and 146 at its opposite end terminates in a bifurcated or slotted portion 148 which receives arms 149 and 150 pivotally mounted on the plate casting 90 by means of a bolt 151 threaded into an inclined portion 152 of the casting. The arms 149 and 150 at their lower ends, diverge respectively and straddle the shaft 10 and the free ends of the diverging portions have openings which engage knob elements 153 projecting from and integral with opposite sides of a collar 154 rotatably mounted on the shaft 10. These collars respectively abut the ends of the adjacent springs on the shaft. It will now be appreciated that if either of the rods 145 and 146 is shifted, the arms 149 and 150 may be shifted about the bolt 151 and this will cause a movement of the collar 154 to compress the spring or if the rod is shifted in the other direction, the compressed spring will move the collar accordingly.

Reference may now be had to Figs. 8 and 9 particularly, and attention is directed to the fact that these figures illustrate the steering mechanism with the front of the mower directed as shown by the arrow. Hence, as in Fig. 6, the spring 113 is at the right of the cam plate 130 and the spring 114 at the left of the cam plate. Now referring to Fig. 8 particularly, the arrangement is such that the springs drivingly connect the shaft 10 to the wheels 11 and 12. If the steering wheel is turned counterclockwise or to the left so that the cam plate is moved into the position shown by Fig. 9, no movement of rod 146 will occur as its inner end will ride over the arcuate surface 134 which is concentric to the axis of the shaft. The inner end of rod 145, however, will be forced to the right owing to the movement of the cam plate and as so disposed the inner end of the rod will seat in the recess 141 so as to hold the parts in position and to give the operator a feel of their relation. When so arranged, the wheel 11 will be released while the wheel 12 will continue to drive the mower and hence the mower will be turned to the left. Manifestly, if the steering wheel is moved in the opposite direction from that shown by Fig. 9, the inner end of rod 146 may be brought to rest in recess 140 and the lawn mower will be turned to the right. Either of these movements may correspond approximately to a 45 degree turn of the steering wheel and the shaft 118. If the steering wheel is turned still farther to the left from its initially and 45 degrees turned position, and hence if the cam plate as shown in Fig. 9 is turned still farther to the left, rod 146 will be pushed outwardly and this will result in an interruption of the driving connection between wheel 12 and shaft 10. During this further movement of the cam plate, rod 145 substantially maintains its same position owing to the arcuate surface with which it is engaged, and finally will engage the central recess 142 while apex 137 will engage the end of rod 146. If the steering wheel and cam plate are turned 90 degrees to the right from the position shown in Fig. 8, both wheels also will be disconnected from the shaft 10. Thus, the steering wheel may be turned 45 degrees in either direction and the lawn mower will turn according to this direction, and if the steering wheel is turned still farther 45 degrees in either direction, both wheels will be disconnected from the driving shaft.

The amount the steering wheel is turned may be indicated to the operator by forming suitable indicia on the wheel and providing a stationary marker, as indicated at 157 in Fig. 10. This marker may be secured to the sleeve 119 and extend over the upper part of the steering wheel.

In either mower described, the parts at opposite sides, are identical, where this is practical, and this naturally reduces manufacture and replacement costs. It is apparent that ready access may be had to any part of the mower, and that such adjustments or replacements as may ever be necessary, can be made with little difficulty. It is also apparent that the endless cutter band may be removed or replaced without difficulty owing to the lateral adjustability of the pulleys, and that this feature also enables tightening or loosening of the band when desired.

Either mower operates to cut grass evenly and with minimum effort owing to the distribution of the grass cutting action and cutting stresses. Moreover, either mower will operate without leaving flattened grass and hence strips of uncut grass that result from flattening the grass before it is cut. Either mower also enables cutting close to fixtures, such as fences, walls, trees, etc., and particularly when the mower is moved in a direction toward or normal to the fixture. It will be appreciated that the hand manipulated mower operates silently, while in the power operated mower that the only appreciable noise is created by the internal combustion engine.

In the power operated mower, turning is readily effected by manipulation of the steering wheel, and by proper manipulation of the latter, the engine can be drivingly disconnected from both drive wheels. Moreover, a smooth transmission of power is obtained.

In general, the mowers provided are relatively inexpensive, and are designed to be extremely durable so as to eliminate repairs or replacements as much as possible. Moreover, they are designed to obtain smooth and even cutting of the grass, with a minimum requirement of manual or power effort.

Although more than one form of the invention has been illustrated and described in detail, it will be apparent to those skilled in the art that various modifications may be made without departing from the scope of the appended claims.

What I claim is:

1. A mower comprising a stationary cutter bar element having entry teeth, an endless cutter band element having teeth adapted to cooperate with the teeth in the bar for cutting grass entering between teeth in the bar, one element in a length corresponding to the length of the bar having one more tooth than the number of teeth in the other element, and means for driving the endless cutter band whereby during operation of the mower a substantially even torque condition will be obtained at all times which enables operating the mower by exercise of a substantially minimum constant force.

2. A mower comprising a movable cutter element, rotatable means adapted to move the cutter element and including a shaft and a pair of ground contacting wheels rotatably mounted thereon adjacent opposite ends of the shaft respectively, and helical springs wound closely on the shaft and connected at one end respectively to the wheels, the springs having frictional contact only with the shaft through engagement of its inner periphery with the surface of the shaft, so that upon relative rotation of the wheels and shaft in one direction, the springs tightly bind on the shaft and upon relative rotation of the wheels and shaft in the other direction, the springs tend to unwind and loosen on the shaft and turn relative thereto, the arrangement providing a differential drive between the wheels and shaft advantageous particularly when the mower is making a turn.

3. A mower comprising a stationary cutter bar having teeth, an endless cutter band of integral construction and having teeth adapted to cooperate with the teeth in the stationary bar, and means for driving the band, the teeth in the band being V-shape with the apex portions thereof rounded to avoid breakage as a result of fatigue stresses.

4. A mower comprising a transverse driving shaft, housing means mounted on opposite ends of the shaft, forwardly projecting shafts journaled in the housing means, pulleys mounted on the front ends of the forwardly projecting shafts, a stationary cutter bar operatively connected to the housing means, an endless cutter band trained around the pulleys, a driving connection between the first shaft and one of the forwardly projecting shafts, and means for adjusting one of the housing means relative to the cutter bar so as to tighten the band on the pulleys.

5. In a mower, a shaft, a pair of housings on opposite ends of the shaft, forwardly projecting shafts journaled in the housings, and a transverse cutter bar releasably secured to the housings.

6. A mower comprising a shaft, housings adjustably mounted on opposite ends of the shafts, a transversely extending casting in front of and releasably connected to the housings, said casting being open centrally and between its ends, and including a stationary cutter bar extending transversely at its lower edge, rotatable pulleys mounted at opposed ends of the casting, an endless cutter band trained around the pulleys and adapted to cooperate with the stationary cutter bar, means for driving the band, and means for adjustably connecting the housings to the casting so as to enable tightening the band on the pulleys.

7. A mower comprising a front transversely extending casting open intermediate its ends and including a stationary cutter bar extending along the lower edge of the casting, shafts projecting forwardly through enlarged openings at each end of the casting, pulleys mounted on the shafts in front of the casting, an endless cutter band trained around the pulleys and having its lower run adjacent the stationary cutter bar, means adjustably supporting each shaft on the casting for adjustment along the latter, and means for driving the endless cutter band.

8. In a mower, a transversely extending casting open intermediate its ends, a stationary cutter extending transversely and joining lower and opposite end portions of the casting, transverse guides on the ends of the casting, housing means adjustably mounted on the guides for adjustment along the casting, pulleys rotatably supported by the housings in the vertical plane of the cutter bar, an endless cutter trained around the pulleys and adapted to cooperate with the cutter bar, and means for driving the endless cutter.

9. A lawn mower comprising a frame structure, plates releasably secured to the structure at opposite sides thereof and being adjustable in their own plane, means on the structure for holding the plates in their adjustable positions, a handle pivotally connected to the plates, and means on the plates for limiting pivotal movement of the handle.

10. A lawn mower comprising a casting in the form of a member having spaced sides and ends connected to the sides and forming a closed periphery and including a stationary cutter bar along a linear edge thereof, pulleys rotatably and operatively mounted on opposite ends of the annulus, an endless cutter trained around the pulleys and having one run extending along the cutter bar, and cover means for housing the pulleys, but allowing the endless cutter to travel around such pulleys.

11. A mower comprising a casting in the form of a one piece member having spaced sides and ends connected to the sides and forming a closed periphery, one linear side of the casting having teeth and constituting a cutter bar.

12. A power driven mower comprising a driving shaft, ground contacting wheels rotatably mounted on the shaft, power means operatively and drivingly connected to the shaft, driven grass cutting means operatively connected to the shaft, individually operated means for drivingly connecting and disconnecting either wheel with respect to the shaft, and manually operable means extending rearwardly of the mower for optionally connecting or disconnecting either or both wheels with respect to the shaft.

13. A power driven mower comprising a driving shaft, wheels rotatably mounted on opposite end portions of the shafts respectively, grass cutting means operatively and drivingly connected to the shaft, power operated means, means drivingly connecting the power operated means to the shaft, a pair of helical springs closely encircling the shaft and adapted to bind on the shaft when the latter turns in one direction, and means connecting one end of the springs respectively to the wheels, the arrangement being such that during rotation of the shaft, the springs frictionally bind on the shaft and drive the wheels.

14. A power driven mower comprising a driving shaft, wheels rotatably mounted on opposite end portions of the shaft, grass cutting means operatively and drivingly connected to the shaft, power operated means drivingly connecting the power operated means to the shaft, a pair of helical springs closely encircling and normally having frictional engagement with the shaft, with convolutions of the springs normally separated, means connecting one end of the springs respectively to the wheels, and means for compressing either of the springs in an axial direction so as to vary the diameter thereof, the arrangement being such that during rotation of the shaft the springs frictionally bind to the shaft and drive the wheels, but upon compressing one of the springs, the diameter is increased and driving of the wheel thereby is interrupted.

15. A power driven mower comprising a driving shaft, ground contacting wheels rotatably mounted on opposite end portions of the shaft, grass cutting means operatively and drivingly connected to the shaft, power operated means, means drivingly connecting the power operated means to the shaft, a pair of helical springs closely encircling and normally having frictional engagement with the shaft, with convolutions of the springs normally separated, means connecting one end of the springs respectively to the wheels, and manually operable steering means on the mower for compressing either of the springs in an axial direction, whereby upon compressing either spring its diameter is increased to permit the shaft to turn loosely in the spring.

16. A mower comprising a shaft, a rotary ground contacting means on the shaft, housings at the end of the shaft and in which the ends of the latter are journaled, a forwardly projecting shaft journaled in each housing, pulleys on the forward ends of the latter shafts, an endless cutter element trained around the pulleys, means operatively connecting the first shaft with one of the forwardly projecting shafts, and means adjustably connecting the housings so as to render them adjustable longitudinally of the first mentioned shaft.

17. A mower comprising a shaft, rotary ground contacting means on the shaft, forwardly projecting housings at the ends of the shaft and in which the ends of the latter are journaled, a forwardly projecting shaft journaled in each housing, pulleys on the forward ends of the latter shafts, an endless cutter element trained around the pulleys, means in one housing drivingly connecting the shafts journaled therein, and means adjustably connecting the housings so as to render them adjustable longitudinally of the first shaft.

18. A mower comprising a shaft, rotary ground contacting means on the shaft, interchangeable housings at the ends of the shaft respectively and in the ends of the latter are journaled, a forwardly projecting shaft journaled in each housing, pulleys on the forward ends of the latter shafts, an endless cutter element trained around the pulleys, means operatively connecting the first shaft with one of the forwardly projecting shafts, and means adjustably connecting the housings so as to render them adjustable longitudinally of the first mentioned shaft.

19. A mower comprising a shaft, rotary ground contacting means on the shaft, housings on the end of the shafts and having access openings, forwardly projecting shafts journaled in the housings, grass cutting means operatively connected to the forward ends of the latter shafts, means in one housing drivingly connecting the shafts journaled therein, cover plates for the access openings in the housings, and a handle pivotally connected to the cover plates.

20. In a mower a member having spaced sides and ends connected to the sides and forming a closed periphery disposed in a substantially vertical plane and having one longitudinal edge notched to provide a cutter bar, pulleys within and at opposite ends of the annulus, an endless toothed cutter element trained around the pulleys and having one run extending along the cutter bar with its other run extending along the upper edge of the annulus, means cooperating with the annulus for housing the pulleys and upper run of the element, and means for maintaining the lower run of the element closely adjacent to the cutter bar.

21. A power driven mower comprising a driving shaft, ground contacting wheels rotatably mounted on the shaft at opposite ends thereof, power means operatively and drivingly connected to the shaft, individually operated means for drivingly connecting and disconnecting the wheels with respect to the shaft, a single rotary steering member extending rearwardly of the mower, and means operatively connecting said steering member to the last mentioned means and being of such character that in moving the steering member in one direction one wheel may be disconnected from the shaft while leaving the other connected to the shaft, and in turning the steering member in the other direction, the other wheel may be disconnected from the shaft without disconnecting the first wheel.

22. A power driven mower comprising a driving shaft, ground contacting wheels rotatively mounted on the shaft at opposite ends thereof, power means operatively and drivingly connected to the shaft, individually operated means for drivingly connecting and disconnecting the wheels with respect to the shaft, a single rotary steering member extending rearwardly of the mower, and means operatively connecting said steering member to the last mentioned means and including means for disconnecting one or both wheels from the shaft in turning the steering member in one direction.

23. A power driven mower comprising a driving shaft, ground contacting wheels rotatably mounted on the shaft at opposite ends thereof, power means operatively and drivingly connected to the shaft, individually operated means for drivingly connecting and disconnecting the wheels with respect to the shaft, a single rotary steering member extending rearwardly of the mower, and means operatively connecting said steering member to the last mentioned means including means for disconnecting one wheel from the shaft without disconnecting the other wheel with respect to the shaft when the steering member is turned in one direction and for disconnecting both wheels with respect to the shaft upon continued movement of the steering member in said direction.

24. A power driven mower comprising a driving shaft, ground contacting wheels rotatively mounted on the shaft at opposite ends thereof, power means operatively and drivingly connected to the shaft, individually operated means for drivingly connecting and disconnecting the wheels with respect to the shaft, a single movable steering member extending rearwardly of the mower, and means operatively connecting said steering member to the last mentioned means and being of such character that in moving the steering member to one position one wheel may be disconnected from the shaft while leaving the other connected to the shaft and in moving the steering member to another position, the other wheel may be disconnected from the shaft without disconnecting the first wheel.

25. A power driven mower comprising a driving shaft, ground contacting wheels rotatably mounted on the shaft at opposite ends thereof, power means operatively and drivingly connected to the shaft, individual springs closely wound on the shaft and connected to the wheels respectively and adapted to have frictional engagement with the shaft for drivingly connecting the wheels with respect to the shaft, a single movable steering member extending rearwardly of the mower, means operatively connecting the steering member with the springs including means for compressing one spring so as to increase its diameter and thereby disconnect its wheel from the shaft while leaving the other wheel connected to the shaft when the steering member is moved to one position, and for compressing the other spring and similarly disconnecting its wheel from the shaft without disconnecting the first wheel when the steering member is moved to another position.

26. A lawn mower comprising a shaft, vertically disposed and spaced pulley wheels adjacent the ends of the shaft, an endless and toothed cutter band trained around the pulley, a stationary and toothed cutter bar extending along the lower run of the band, means for moving the mower including wheels rotatably mounted on opposite ends of the shaft, a driving connection between the shaft and one of the pulley wheels, individual means for drivingly connecting either wheel with respect to the shaft, and manually operable means for controlling said individual means selectively.

27. A lawn mower comprising a frame, a pair of pulleys on the frame, an endless cutter band trained about the pulleys, a cutter bar cooperating with the band, means for driving the band, and means for adjustably mounting one of the pulleys on the frame so as to enable tightening of the band about the pulleys.

WILLIAM H. MANNING.